United States Patent [19]

Leath

[11] Patent Number: 4,964,914
[45] Date of Patent: Oct. 23, 1990

[54] METHOD FOR DISPOSING OF HAZARDOUS WASTE MATERIAL WHILE PRODUCING A REUSABLE BY-PRODUCT

[75] Inventor: E. L. "Buddy" Leath, Avalon, Tex.

[73] Assignee: Chemical Reclamation Services, Inc., Avalon, Tex.

[21] Appl. No.: 230,855

[22] Filed: Aug. 10, 1988

[51] Int. Cl.$^5$ .............................................. C04B 7/02
[52] U.S. Cl. .................... 106/745; 106/697; 106/757; 241/29; 241/DIG. 38; 423/DIG. 20
[58] Field of Search .................... 106/103, 100; 241/16, 241/21; 585/240; 423/DIG. 18; 134/38, 40; 421/DIG. 38, 29

[56] References Cited

U.S. PATENT DOCUMENTS

| | | |
|---|---|---|
| 3,224,839 | 12/1965 | Pierson . |
| 3,506,414 | 4/1970 | Skendrovic . |
| 3,626,874 | 12/1971 | Grant . |
| 3,766,867 | 10/1973 | DeAngelis . |
| 4,022,630 | 5/1977 | Watson et al. ............... 241/17 |
| 4,099,473 | 7/1978 | Mackenzie et al. .......... 110/219 |
| 4,113,185 | 9/1978 | Marsh et al. ................. 241/21 |
| 4,123,288 | 10/1978 | Stringer et al. .............. 106/103 |
| 4,256,503 | 3/1981 | Tsuda et al. ................. 106/100 |
| 4,295,823 | 10/1981 | Ogawa et al. ................ 106/100 |
| 4,624,417 | 11/1986 | Gangi ........................... 423/106 |
| 4,627,877 | 12/1986 | Ogawa et al. ................ 106/100 |
| 4,630,556 | 12/1986 | Scheffee ........................ 110/347 |
| 4,678,514 | 7/1987 | Deyhle et al. ................ 106/103 |

FOREIGN PATENT DOCUMENTS 0823605 11/1959 United Kingdom ............ 241/15

OTHER PUBLICATIONS

*Chem. Eng. Handbook*, Perry and Chilton, 5th ed., (1973), p. 7-4:7-9.

Primary Examiner—William R. Dixon, Jr.
Assistant Examiner—Melissa Bonner
Attorney, Agent, or Firm—Charles D. Gunter, Jr.

[57] ABSTRACT

A method is shown for disposing of hazardous waste material without utilizing landfill or bulk incineration. The hazardous waste material is first fed to a shredder for shredding the waste material to pieces of a range of predetermined sizes. The solid hazardous waste material is intermixed with an inlet stream of recycled flammable fuel. The shredded material and combined fuel is then transported by means of a screw conveyor to a dissolving tank, the dissolving tank being provided with a mechanical agitator for agitating the shredded material and combined fuel to produce a homogeneous, flammable mixture. The contents of the dissolving tank are passes to a storage tank once a homogeneous, flammable mixture is achieved.

5 Claims, 1 Drawing Sheet

METHOD FOR DISPOSING OF HAZARDOUS WASTE MATERIAL WHILE PRODUCING A REUSABLE BY-PRODUCT

BACKGROUND OF THE INVENTION

1. Field of the Invention:

The present invention relates to the recovery of materials from solid hazardous waste, and specifically to a process for treating solid hazardous waste to obtain a fuel which can be used to produce cement clinker.

2. Description of the Prior Art:

Solid waste materials have traditionally presented problems of disposal which have become increasingly critical in recent years. Conventionally, hazardous solid waste has been disposed of by means of landfill or incineration. Concern with problems of natural resources and the dwindling supply of acreage suitable for landfill has focused the need for alternate methods for disposing of solid waste materials. Recently passed environmental regulations have effectively eliminated landfill for disposing of "hazardous" waste materials, such as paint bottoms, lacquer, thinners, ketones, industrial solvents, petroleum products, and the like. Incineration, while still available as a disposal technique, is so expensive as to be economically prohibitive for some industries.

The present invention has as its object to provide an efficient and inexpensive process for converting hazardous solid waste into a useful energy source for production of useful products and for conversion into a useful product such as cement clinker.

The present invention has as its object to provide a method for utilizing hazardous waste in a way which permits total disposal of the waste with none of the disadvantages present in the prior art methods.

The present invention also has as its object to utilize hazardous waste in a process for making cementitious material, particularly Portland cement.

The present invention has as a further object to produce virtually no unusable residues, thereby eliminating the need for landfill sites or further incineration.

SUMMARY OF THE INVENTION

In the method of disposing of solid-containing hazardous waste material of the invention, the hazardous waste material is fed to a large particle shredder for shredding the waste material to pieces of a range of predetermined sizes. The solid hazardous waste material in the large particle shredder is intermixed with an inlet stream of recycled flammable fuel from the back-end of the process to produce a solid-liquid stream.

The solid-liquid stream from the large particle shredder is transported by a primary screw conveyor via a primary dissolving tank to a small particle shredder. The majority of the liquid and dissolved solids from the solid-liquid stream go into the primary dissolving tank while the remaining undissolved solid particles are fed into the small particle shredder. The primary dissolving tank is provided with a mechanical agitator for agitating the dissolved solids and combined fuel. A portion of the dissolved solids and combined fuel is pumped from the primary dissolving tank to the small particle shredder to be intermixed with the solids from the primary screw conveyor. The small particle shredder further reduces the particle size of the entering solids to a range of predetermined sizes.

The contents of the small particle shredder are transported by a secondary screw conveyor to a secondary dissolving tank. The secondary dissolving tank is provided with a mechanical agitator for agitating the dissolved solids and combined fuel to produce a homogeneous, flammable mixture. At least a portion of the homogeneous flammable mixture is diverted from the secondary dissolving tank to a storage tank. A portion of the stored flammable mixture from the storage tank is introduced back to the large particle shredder as the inlet stream of recycled flammable fuel.

Additional objects, features and advantages will be apparent in the written description which follows.

DESCRIPTION OF THE PREFERRED EMBODIMENT

Figure 1:
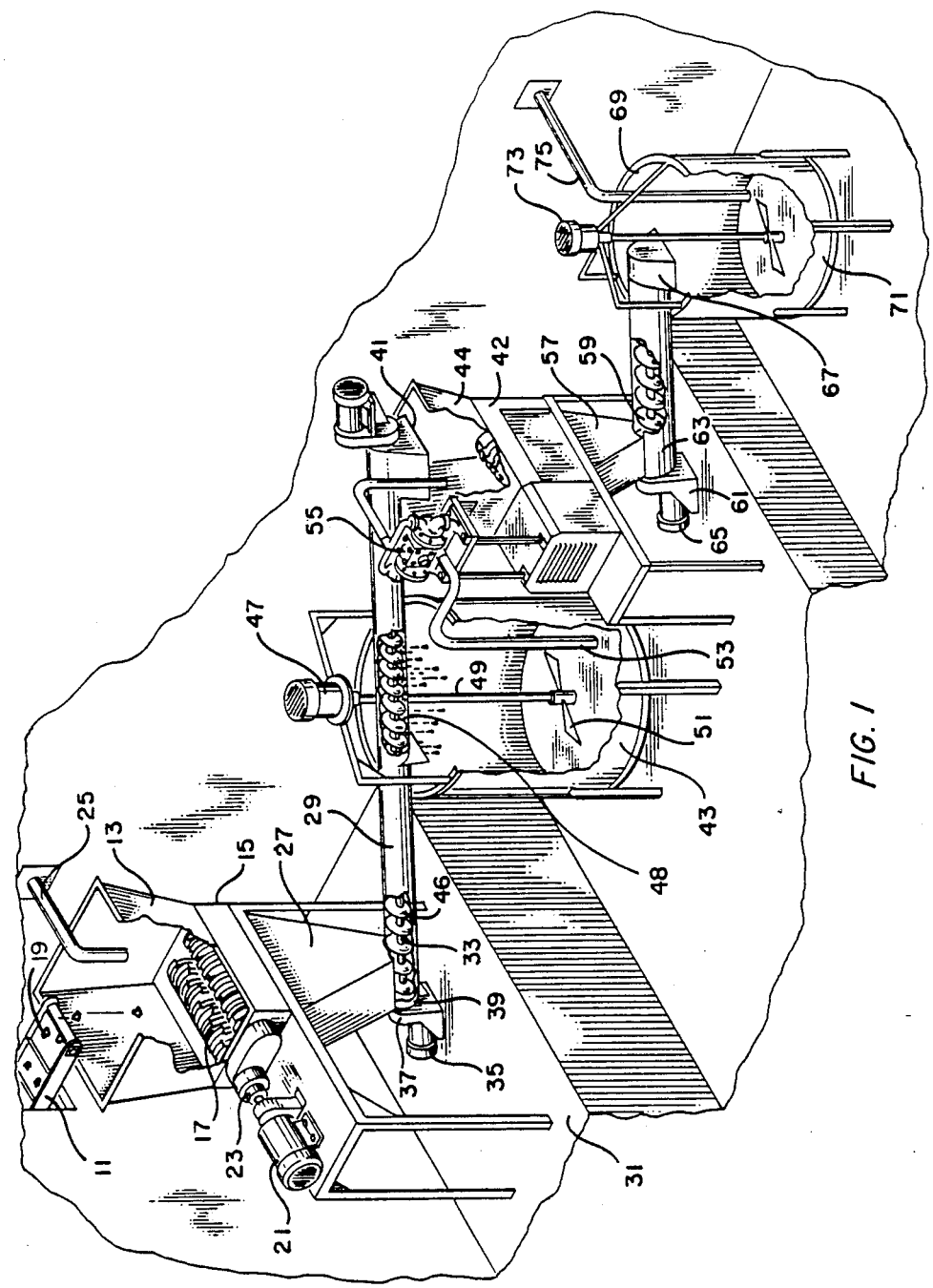
FIG. 1 is a plan view of the equipment used to practice the method of the invention, with portions broken away for ease of illustration.

FIG. 1 shows the equipment used in the process of disposing of hazardous waste material of the invention. The hazardous waste material can be any solid-containing hazardous waste which can be treated with the process to produce a flammable fuel product having a BTU requirement sufficient to produce cement clinker without detriment to the final cement quality. The minimum BTU requirement is 5000 BTU/lb with the preferred BTU content of the flammable fuel product being at least about 10,500 BTU/lb, most preferably at least about 11,000 BTU/lb. The solid hazardous waste are broken down in size to dimensions between about ¼" and 5 microns in range as they are blended into the flammable fuel mixture. Specific hazardous waste materials which have been used successfully in the process include dry paint, paint bottoms, thinners, lacquers, dirty mineral spirits, ketones, petroleum products, chemical resins, industrial solvents etc.

The solid hazardous waste material enters the process by means of a conveyor 11. A magnetic metal remover can be used to extract metal from the waste material prior to entering the process, if desired. The waste material 19 then empties into the upper compartment 13 of a large particle shredder 15. The large particle shredder 15 is a rotary shear shredder and includes wear resistant cutters 17 which mesh to shred the solid-containing waste material 19 down to a particle size of about 1" in diameter. A suitable shredder is commercially available from Shredding Systems, Inc., of Wilsonville, Oreg. The rotating cutters 17 are driven by a motor 21 through a gearbox 23. Any liquid hazardous waste which are being introduced to the process, such as industrial solvents, dirty mineral spirits, petroleum products, etc. are dumped directly from drums into the upper compartment 13 of the large particle shredder. An inlet stream 25 of stored flammable mixture from a storage tank (not shown) is also continuously introduced into the upper compartment 13 of the large particle shredder 15 to help in breaking up the solid waste material 19 entering from the conveyor 11. As will be explained, the inlet stream 25 is not taken from separate flammable feedstock, but is instead recirculated from the back-end of the process. Thus, it is not necessary to supplement the BTU requirement of the flammable mixture of the process by introducing a separate feedstock of flammable fuel.

The large particle shredder 15 shreds the waste material to pieces of a range of predetermined sizes. Preferably, the particle size is in the range from about 1" to ¾". After passing through the cutters 17, the solid waste material and combined fuel from inlet 25 pass through a chute 27 to the inlet of a primary screw conveyor 29. Primary screw conveyor 29 is inclined at about a 45 degree angle with respect to the horizontal surface 31 and includes a shaft 33 driven by a motor 35 and belt drive 37.

The primary screw conveyor 29 has a feed end 39 which includes the inlet for receiving the feed from the chute 27 and has a discharge end 41 which delivers discharge to a small particle shredder 42 located at a lower elevation than the shredder 15. The discharge end 41 is open to atmospheric pressure and allows the discharge from the primary conveyor 29 to fall into the open top 44 of the small particle shredder 42. The small particle shredder 42 is similar to shredder 15 in construction and operation, but further reduces the particle size of the solids in the entering stream to a predetermined size range. Preferably, the particle size is reduced in the range from about 5 microns to ¼", with the preferred average size of the reduced particles being about ¼".

The flighting 46 on the conveyor shaft 33 is of a uniform 10 inch diameter, the flights being spaced approximately 10 inches apart. The primary conveyor 29 is itself approximately 10 feet in length.

The cylindrical casing for the primary conveyor 29 has perforations 48 along a portion of the under side thereof to allow the majority of the liquid in the liquid-solid stream to fall out by gravity into the open top 45 of a primary dissolving tank 43. The dissolving tank 43 is equipped with an electrically driven agitator 47 having a driven shaft 49 with agitator blades 51. The agitator 47 in the primary dissolving tank 43 agitates the droppings from the conveyor perforations 48 to produce a more nearly homogeneous, flammable mixture.

An outlet line 53 passes from the bottom of the primary dissolving tank 43 to the open top 44 of the small particle shredder. An in-line air pump 55 also moves agitated mixture from the dissolving tank 43 to the top of the small particle shredder to mix with the incoming solids being dropped from the primary conveyor 29. The pump 55 can be, e.g., a commercially available positive displacement air-operated diaphragm pump designed for pumping abrasive slurries, such as the Teel Industrial Series No. 2P427, or the like.

The discharge from the small particle shredder 42 passes through a chute 57 to the inlet end 59 of a secondary screw conveyor 61. Secondary conveyor 61 is similar to primary conveyor 29 and includes a generally cylindrical casing 63 approximately 10 feet long which holds a shaft driven by a motor 65. The shaft is similar to shaft 33 with fighting for moving the solid-liquid mixture toward a discharge end 67. The flighting on the secondary conveyor 61 is of a uniform 8" diameter and fills the cylindrical casing 63. However, the spacing of the flighting, along the longitudinal axis of the shaft, decreases toward the discharge end 67 of the screw conveyor to produce increased retention time of the shredded material and combined fuel at the discharge end of the screw conveyor. In the preferred case, the 8" flighting is spaced 10 inches apart at the feed end 59. Approximately 32 inches from the discharge end 67, the flighting assumes a 4 inch spacing. The closer spaced flighting and gravitational pull at the discharge end 67 of the secondary conveyor produce increased churning of the material and assist in further pulverizing the larger particles of solid material in the mixture.

The discharge from the secondary screw conveyor 61 falls by gravity into the open top 69 of a secondary dissolving tank 71, similar in design to tank 43. The secondary dissolving tank 71 is also equipped with a mechanical agitator 73 for producing a homogeneous mixture of shredded solids and liquid in the tank. An air pump, similar to pump 55, is used to draw the flammable mixture from the tank 71, out the discharge line 75 to a storage tank (not shown).

The stored flammable mixture can then be transported to a cement factory for producing cement clinker. In a typical cement manufacturing operation, the basic mineral matter (Portland cement-making material) is fed into a rotary kiln in conventional manner for a cement clinker kiln. The typical operating temperature of the kiln is in the range from about 1000° to 1500° C., e.g., around 1350° C., with a flame temperature of about 1800° C. The kiln is preferably brought to operating temperature by injecting traditional fuel, e.g., natural gas, through an adjacent port. Once operating temperature of the kiln is achieved, the flammable mixture of the invention is injected through an adjacent injection port. The mixture of gas, flammable fuel of the invention and cement-producing aggregate are rolled in the cylinder at operating temperature. Any remaining ash from the flammable fuel mixture of the invention goes into the resulting cement clinker.

The relative proportions of flammable fuel mixture from the method of the invention and cement-making material can be controlled to obtain Portland cement clinker without any detriment to final cement quality. Cement manufacturing processes useful with the flammable fuel of the invention are familiar to those skilled in the art and include, for example, those shown in U.S. Pat. No. 4,627,877, issued Dec. 9, 1986, to Ogawa et. al; U.S. Pat. No. 4,022,630, issued May 10, 1977, to Watson et. al; and U.S. Pat. No. 4,678,514, issued Jul. 7, 1987, to Deyhle et. al.

An invention has been provided with several advantages. The present invention provides a convenient and inexpensive method for disposing of hazardous waste without utilizing landfill or conventional incineration in bulk. A variety of hazardous waste materials can be accomodated including paint bottoms, lacquer, thinners, petroleum wastes, and the like. The hazardous waste material is also converted into a useful by-product, a flammable fuel, which can be used to fire a rotary kiln for producing cement clinker, any resulting ash forming a portion of the cement clinker itself.

While the invention has been shown in only one of its forms, it is not thus limited but is susceptible to various changes and modifications without departing from the spirit thereof.

I claim:

1. A method for converting a hazardous waste material, containing flammable organic chemical components at least part of which are solid to an essentially liquid flammable fuel product having a BTU content in excess of 5,000 BTU/lb, the method comprising the steps of:

feeding the hazardous waste material to a large particle shredder for shredding the waste material to pieces of a range of predetermined sizes, the hazardous waste material being intermixed with an inlet stream of recycled flammable fuel to form a liquid-solid mixture;

transporting the liquid-solid mixture by means of a primary screw conveyor, via a primary dissolving tank, to a small particle shredder, the primary dissolving tank being provided with a mechanical agitator for agitating the contents thereof to produce a near homogeneous mixture of dissolved solids and combined fuel;

further reducing the size of the solid particles being transported by the primary conveyor by passing the solid particles through the small particle shredder;

transporting the contents of the small particle shredder by means of a secondary conveyor to a secondary dissolving tank, the secondary dissolving tank being provided with a mechanical agitator for agitating the contents thereof to produce a homogeneous, flammable mixture;

passing the homogeneous, flammable mixture from the secondary dissolving tank to a storage tank; and introducing a portion of the stored flammable mixture from the storage tank back to the shredder as the inlet stream of recycled, a flammable fuel.

2. A method for converting a hazardous waste material, containing flammable organic chemical components at least part of which are solid to an essentially liquid flammable fuel product having a BTU content in excess of 5,000 BTU/lb, the method comprising the steps of:

feeding the hazardous waste material to a large particle shredder for shredding the solid component of the waste material to pieces having a particle size in the range from about ¾ inches to 1 inches, the hazardous waste material being intermixed with an inlet stream of recycled flammable fuel to form a liquid-solid mixture;

transporting the liquid-solid mixture by means of a primary screw conveyor, via a primary dissolving tank, to a small particle shredder, the bulk of the liquids and dissolved solids in the liquid-solid mixture being deposited in the primary dissolving tank while the undissolved solids are fed to the small particle shredder, the primary dissolving tank being provided with a mechanical agitator for agitating the contents thereof to produce a near homogeneous mixture of dissolved solids and combined fuel;

further reducing the size of the solid particles being transported by the primary conveyor by passing the solid particles through the small particle shredder the solid particles being reduced in the range from about 5 microns to ½ inch;

pumping a portion of the mixture from the primary dissolving tank to the small particle shredder to be intermixed with the solids from the primary screw conveyor;

transporting the contents of the small particle shredder by means of a secondary screw conveyor to a secondary dissolving tank, the secondary dissolving tank being provided with a mechanical agitator for agitating the contents thereof to produce a homogeneous, flammable mixture;

passing the homogeneous, flammable mixture from the secondary dissolving tank to a storage tank; and introducing a portion of the stored flammable mixture from the storage tank back to the shredder as the inlet stream of recycled, flammable fuel.

3. A method for disposing of hazardous waste material containing flammable organic chemical components at least part of which are solid to an essentially liquid flammable fuel product having a BTU content in excess of 5,000 BTU/lb, while producing a reusable by-product, the method comprising the steps of:

feeding the hazardous waste material to a large particle shredder for shredding the solid component of the waste material to pieces having a particle size in the range from about ¾ inches to 1 inches, the hazardous waste material being intermixed with an inlet stream of recycled flammable fuel to form a liquid-solid mixture;

transporting the liquid-solid mixture by means of a primary screw conveyor, via a primary dissolving tank, to a small particle shredder, the bulk of the liquids and dissolved solids in the liquid-solid mixture being deposited in the primary dissolving tank while the undissolved solids are fed to the small particle shredder, the primary dissolving tank being provided with a mechanical agitator for agitating the contents thereof to produce a near homogeneous mixture of dissolved solids and combined fuel;

further reducing the size of the solid particles being transported by the primary conveyor by passing the solid particles through the small particle shredder the solid particles being reduced in the range from about 5 microns to ½ inch;

pumping a portion of the mixture from the primary dissolving tank to the small particle shredder to be intermixed with the solids from the primary screw conveyor;

transporting the contents of the small particle shredder by means of a secondary screw conveyor to a secondary dissolving tank, the secondary dissolving tank being provided with a mechanical agitator for agitating the contents thereof to produce a homogeneous, flammable mixture;

passing the homogeneous, flammable mixture from the secondary dissolving tank to a storage tank;

introducing a portion of the stored flammable mixture from the storage tank back to the shredder as the inlet stream of recycled, flammable fuel;

introducing a cement raw feed material into a conventional rotary cement kiln;

firing the conventional cement kiln by introducing into the kiln the flammable mixture from the storage tank and cement raw feed material;

controlling the relative proportion of flammable fuel and cement raw material to obtain a cement clinker of selected final quality;

recovering the cement clinker of selected final quality from the kiln.

4. The method of claim 3, wherein the secondary screw conveyor has contained therein a rotatable shaft with constant diameter flighting, and wherein the spacing of the flighting on the shaft decreases toward the discharge end of the secondary screw conveyor to thereby produce increased retention time of the shredded material and combined fuel at the discharge end of the secondary conveyor.

5. A method for disposing of hazardous waste material containing flammable organic chemical components at least part of which are solid to an essentially liquid flammable fuel product having a BTU content in excess of 5,000 BTU/lb, while producing a reusable by-product, the method comprising the steps of:

feeding the hazardous waste material to a large particle shredder for shredding the solid component of the waste material to pieces having a particle size in the range from about ¾ inches to 1 inches, the solid hazardous waste material being intermixed with an inlet stream of recycled flammable fuel of a known BTU content the BTU content being at least about 10,500 BTU/lb;

transporting the liquid-solid mixture by means of a primary screw conveyor, via a primary dissolving tank, to a small particle shredder, the bulk of the liquids and dissolved solids in the liquid-solid mixture being deposited in the primary dissolving tank while the undissolved solids are fed to the small particle shredder, the primary dissolving tank being provided with a mechanical agitator for agitating the contents thereof to produce a near homogeneous mixture of dissolved solids and combined fuel;

passing the homogeneous, flammable mixture from the secondary dissolving tank to a storage tank;

introducing a portion of the stored flammable mixture from the storage tank back to the shredder as the inlet stream of recycled, flammable fuel;

adjusting the flow of stored flammable mixture entering the shredder to provide a homogeneous, flammable mixture in the dissolving tank having a minimum BTU content of at least about 10,500 BTU/lb;

introducing a cement raw feed material into a conventional rotary cement kiln;

firing the conventional cement kiln by introducing into the kiln the flammable mixture from the storage tank and cement raw feed material;

controlling the relative proportion of flammable fuel and cement raw material to obtain a cement clinker of selected final quality;

recovering the cement clinker of selected final quality from the kiln.

* * * * *